United States Patent
Hornkvist et al.

(10) Patent No.: US 10,824,678 B2
(45) Date of Patent: Nov. 3, 2020

(54) QUERY COMPLETION SUGGESTIONS

(71) Applicant: Apple Inc., Cupertino, CA (US)

(72) Inventors: John M. Hornkvist, Cupertino, CA (US); Vivek Sehgal, Santa Clara, CA (US); Raffael Hannemann, Paris (FR); Lun Cui, Los Altos, CA (US); Alexandre Carlhian, Paris (FR); Thomas Deniau, Paris (FR); Raphaeal Mor, Paris (FR)

(73) Assignee: Apple Inc., Cupertino, CA (US)

( * ) Notice: Subject to any disclaimer, the term of this patent is extended or adjusted under 35 U.S.C. 154(b) by 357 days.

(21) Appl. No.: 15/721,672

(22) Filed: Sep. 29, 2017

(65) Prior Publication Data

US 2018/0349513 A1    Dec. 6, 2018

Related U.S. Application Data

(60) Provisional application No. 62/514,835, filed on Jun. 3, 2017.

(51) Int. Cl.
  *G06F 16/9032* (2019.01)
  *G06F 16/248* (2019.01)
  *G06F 16/2457* (2019.01)

(52) U.S. Cl.
  CPC ...... *G06F 16/90328* (2019.01); *G06F 16/248* (2019.01); *G06F 16/24578* (2019.01)

(58) Field of Classification Search
  CPC .. G06F 17/276; G06F 16/9574; G06F 16/951; G06F 16/3322; G06F 16/90328; G06Q 30/02
  See application file for complete search history.

(56) References Cited

U.S. PATENT DOCUMENTS

| | | | | |
|---|---|---|---|---|
| 9,342,601 | B1* | 5/2016 | Finkelstein | G06F 16/951 |
| 9,892,190 | B1* | 2/2018 | Kirazci | G06F 16/3322 |
| 2009/0249198 | A1* | 10/2009 | Davis | G06F 17/276 |
| | | | | 715/261 |
| 2012/0023120 | A1* | 1/2012 | Kanefsky | G06F 16/9574 |
| | | | | 707/767 |
| 2014/0280107 | A1* | 9/2014 | Heymans | G06F 16/9535 |
| | | | | 707/727 |
| 2015/0178278 | A1* | 6/2015 | Finkelstein | G06F 16/24578 |
| | | | | 707/751 |

(Continued)

*Primary Examiner* — Etienne P Leroux

(74) *Attorney, Agent, or Firm* — Morgan, Lewis & Bockius LLP

(57) ABSTRACT

A device implementing a system for providing query completion suggestions includes at least one processor configured to receive a partial query, and derive one or more query completion suggestions for the partial query from content items that are locally stored on the device, each respective query completion suggestion being associated with metadata extracted from one of the content items from which the respective query completion suggestion was derived. The at least one processor is further configured to rank the one or more query completion suggestions based at least in part on the metadata associated with each of the one or more query completion suggestions. The at least one processor is further configured to provide, for display, at least one of the one or more ranked query completion suggestions.

23 Claims, 10 Drawing Sheets

(56) References Cited

U.S. PATENT DOCUMENTS

2015/0347422 A1* 12/2015 Fadel .................... G06F 16/242
  707/767
2016/0217181 A1* 7/2016 Kadouch ............... G06F 16/951
2017/0046450 A1* 2/2017 Topatan ................. G06Q 30/02

* cited by examiner

```
static double COMPLETION_K1  = K1;  // Boost for more frequently occurring N-grams
static double COMPLETION_K2  = K2;  // Weight of the content item from which the N-gram was generated
static double COMPLETION_K3  = K3;  // Boost for longer N-grams
static double COMPLETION_K4  = K4;  // Boost for more fragments in N-gram
static double COMPLETION_K5  = K5;  // Boost for an N-gram that has more than C% of all occurrences of the parent N-gram
static double COMPLETION_K6  = K6;  // Boost for an N-gram that has more than D% of all occurrences of the root N-gram
static double COMPLETION_K7  = K7;  // Boost for an N-gram that has more than E% of all the occurrences observed
static double COMPLETION_K8  = K8;  // Weight for a linguistically interesting N-grams
static double COMPLETION_K9  = K9;  // Boost for more interesting fields
static double COMPLETION_K10 = K10; // Punishment for N-grams that only occur in a single conversation
static double COMPLETION_K11 = -(A*COMPLETION_K3 );  // Used to punish very long N-grams
static double COMPLETION_K12 = K12; // Boost for a N-gram that matched a previously engaged result for the same partial query
static double COMPLETION_K13 = K13; // Boost for a N-gram that matched an engaged result irrespective of the query
static double COMPLETION_K14 = -(B*COMPLETION_K4 );  // Used to punish longer N-grams
static double COMPLETION_K15 = K15; // Used to punish older content items (that generate N-grams)
static double COMPLETION_K16 = K16; // Used to punish N-grams that contain misspellings
```

*FIG. 8*

```
(double)((((double)weight+completionCount)/completionCount)*COMPLETION_K1 +
(score?(log((double)score)*COMPLETION_K2):0) +
((len<=COMPLETION_LEN_THRESHOLD)?log(((double)len)*(COMPLETION_K3):(log((double)COMPLETION_LEN_THRESHOLD)*(COMPLETION_K3)+log((double)len-COMPLETION_LEN_THRESHOLD)*COMPLETION_K11)) +
((scoringFragmentCount<=COMPLETION_FRAGMENT_THRESHOLD)?
log((double)(scoringFragmentCount/X+Y))*COMPLETION_K4:
((log((double)COMPLETION_FRAGMENT_THRESHOLD/X+Y)*(COMPLETION_K4))+(log((double)(scoringFragmentCount-COMPLETION_FRAGMENT_THRESHOLD)/X+Y))*COMPLETION_K14)) +
((weightF1>WEIGHT1_THRESHOLD)?COMPLETION_K5:0) +
((weightF2>WEIGHT2_THRESHOLD)?COMPLETION_K6:0) +
((weightF3<WEIGHT3_THRESHOLD)?COMPLETION_K7:0) +
(-log(phraseScore)*COMPLETION_K8) +
fieldWeight*COMPLETION_K9 +
threadWeight +
(isShortcut?COMPLETION_K12:0) +
(hasUsedDate?COMPLETION_K13:0) +
Z
) - COMPLETION_K15*(log((age>AGE_THRESHOLD?age:(SECONDS*HOURS*DAYS*CONSTANT) +
(isMispelled?COMPLETION_K16:0))));
```

*FIG. 9*

QUERY COMPLETION SUGGESTIONS

CROSS-REFERENCE TO RELATED APPLICATIONS

The present application claims the benefit of U.S. Provisional Patent Application Ser. No. 62/514,835, entitled "Query Suggestions," filed on Jun. 3, 2017, which is hereby incorporated by reference in its entirety for all purposes.

TECHNICAL FIELD

The present description relates generally to providing query completion suggestions, including providing query completion suggestions based on prior user activity.

BACKGROUND

Electronic devices such as tablets, mobile phones, and computers may execute applications that allow users to perform searches. A user may start to input a search term, or a query, on an electronic device, such as within a search field of an operating system, and the electronic device may display one or more query completion suggestions based on the user input. When the electronic device displays a query completion suggestion that corresponds to the query that the user was in the process of inputting, the user may select the displayed query completion suggestion and avoid having to input the entire query.

BRIEF DESCRIPTION OF THE DRAWINGS

Certain features of the subject technology are set forth in the appended claims. However, for purpose of explanation, several embodiments of the subject technology are set forth in the following figures.

FIG. 8 illustrates example N-gram features and weights in accordance with one or more implementations.

FIG. 9 illustrates an example scoring equation for scoring query completion suggestions in accordance with one or more implementations.

DETAILED DESCRIPTION

Figure 1:
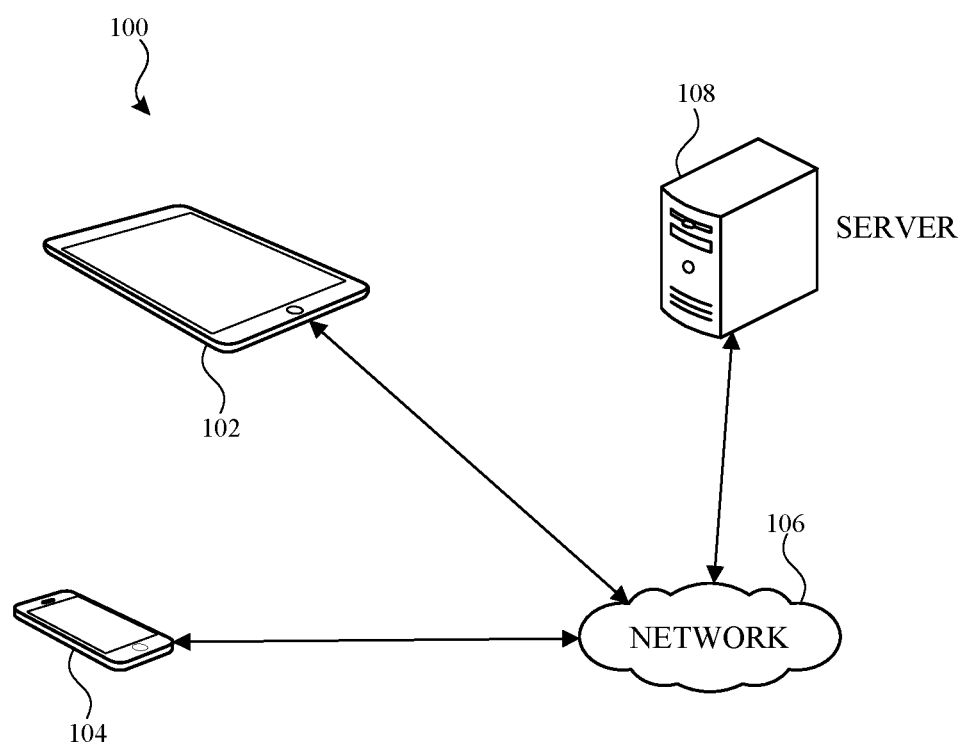
FIG. 1 illustrates an example network environment for providing query completion suggestions in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Query completion suggestions for a partial query may typically be generated based on the most common completions of the partial query across a broad set of users. In some systems, a query completion suggestion may be determined based on prior queries performed by the user who provided the partial query. However, when inputting a partial query for searching local content items, such as on a tablet or mobile device, the most common completions across a broad set of users may not provide the most relevant completions. Furthermore, although the prior queries of the user on the electronic device may provide some guidance for determining relevant query completion suggestions, the prior queries of the user alone are not reflective of the entirety of the user activity on the electronic device.

In the subject system, query completion suggestions for a partial query received for searching an electronic device are generated from content locally stored on the electronic device, such as user-generated content. In this manner, the query completion suggestions may have increased relevance to the content on the electronic device that is being searched. In addition, the subject system incorporates one or more temporal factors pertaining to the activity and/or engagement of the user on the electronic device into the ranking of the query completion suggestions. For example, query completion suggestions may be ranked based on last accessed times (and/or creation times) of the content from which the query completion suggestions were generated. The last accessed time of the content may correspond to the last time that the content was accessed via a search result of a query, and/or the last time that the content was accessed through an application, e.g., independent of a query.

In this manner, query completion suggestions generated from more recently accessed (and/or created) content may be ranked more highly than query completion suggestions generated from less recently accessed and/or created content. Thus, the subject system may provide a user with query completion suggestions that are relevant to locally stored content and that have temporal relevance with respect to the activity and/or engagement of the user on the electronic device, thereby allowing content on the electronic device to be located more quickly/efficiently, e.g. using fewer memory, power, and/or processing resources.

FIG. 1 illustrates an example network environment 100 for providing query completion suggestions in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102 and 104, and a server 108. The network 106 may communicatively (directly or indirectly) couple, for example, any two or more of the electronic devices 102 and 104 and/or the server 108. In one or more implementations, the network 106 may be an interconnected network of devices that may include, or may be communicatively coupled to, the Internet. For explanatory purposes, the network environment 100 is illustrated in FIG. 1 as including the electronic devices 102 and 104 and a single server 108; however, the network environment 100 may include any number of electronic devices and any number of servers.

One or more of the electronic devices 102 and 104 may be, for example, a portable computing device such as a laptop computer, a smartphone, a peripheral device (e.g., a digital camera, headphones), a tablet device, a wearable device such as a watch, a band, and the like, or any other appropriate device. In FIG. 1, by way of example, the electronic device 102 is depicted as a tablet device, and the electronic device 104 is depicted as a smartphone. Each of electronic devices 102 and 104 may be, and/or may include all or part of, the electronic device discussed below with respect to FIG. 2, and/or the electronic system discussed below with respect to FIG. 10.

The server 108 may be, and/or may include all or part of the electronic system discussed below with respect to FIG. 10. The server 108 may include one or more servers, such as a cloud of servers, that may be used in a system for providing query completion suggestions. For example, a user may input at least a partial query or search term within an application (or operating system) running on one of the electronic devices 102 or 104, such as the electronic device 102. The electronic device 102 may perform a local search for query completion suggestions with respect to the partial query, such as query completion suggestions corresponding to contact names, application names, and/or locally stored content, e.g., emails, text messages, and the like. The electronic device 102 may rank the suggestions based at least in part on a temporal factor, such as a time last accessed, a creation date, etc.

The electronic device 102 may concurrently send the search term to the server 108, and the server 108 may provide query completion suggestions, which may be referred to as online query completion suggestions (or online suggestions), to the electronic device 102. The electronic device 102 may then merge the locally generated suggestions with the suggestions received from the server 108, and provide, for example, the top N suggestions for display to the user. Alternatively, or in addition, the electronic device 102 may provide all of the online suggestions received from the server 108 and may backfill the online suggestions with the locally generated suggestions, up to N total suggestions. The value of N may be configurable and dependent upon the screen size of the electronic devices 102 and 104.

An example data flow of a system for providing query completion suggestions for a partial query is discussed further below with respect to FIG. 3, an example process for providing query completion suggestions for a partial query is discussed further below with respect to FIG. 4, and an example process generating and ranking query completion suggestions from local content that matches a partial query is discussed further below with respect to FIG. 5.

Figure 2:
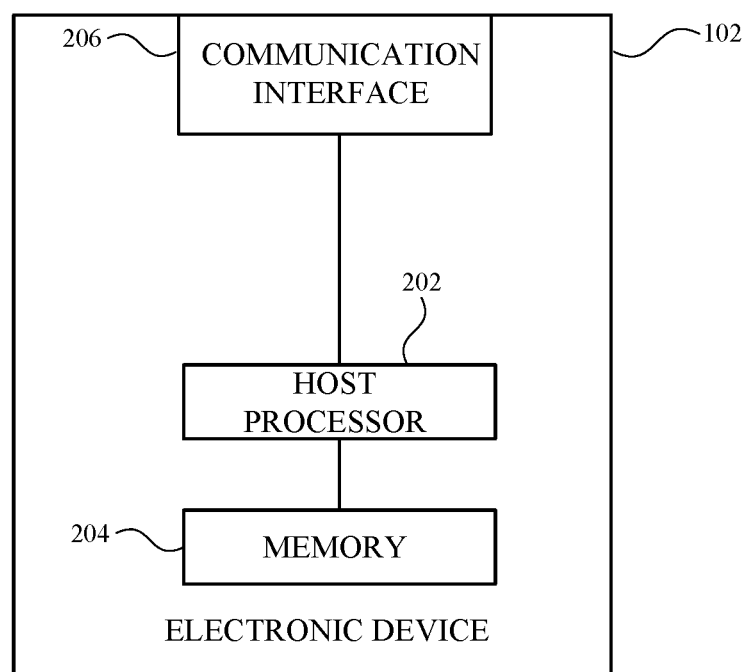
FIG. 2 illustrates an example electronic device that may provide query completion suggestions in accordance with one or more implementations.

FIG. 2 illustrates an example electronic device 102 that may provide query completion suggestions in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202, a memory 204, and a communication interface 206. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. Additionally, the host processor 202 may enable implementation of an operating system or otherwise execute code to manage operations of the electronic device 102.

The operating system executing on the host processor 202 may implement a search module (or search process) that provides for searching content stored on the electronic device 102. The operating system may also allow one or more applications to execute on the host processor 202. The one or more applications may be in communication with the search module of the operating system, such as to provide portions of locally stored content (e.g., indexed content items) to be matched by the search module to generate query completion suggestions. In the subject system, the host processor 202, e.g. via the search module, may implement the data flow for providing query completion suggestions that is discussed further below with respect to FIG. 3.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. In one or more implementations, the memory 204 may store an indexed content datastore (or generally any data structure), such as for the search module to store the content items received from the applications.

The communication interface 206 may include suitable logic, circuitry, and/or code that enables wired or wireless communication, such as between any of the electronic devices 102 or 104 and server 108 over the network 106. The communication interface 206 may include, for example, one or more of a Bluetooth communication interface, an NFC interface, a Zigbee communication interface, a WLAN communication interface, a USB communication interface, or generally any communication interface. The communication interface 206 may be used to transmit search terms, partial search terms, and/or other information to the server 108, and to receive query completion suggestions, search results, and/or other information from the server 108.

In one or more implementations, one or more of the host processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
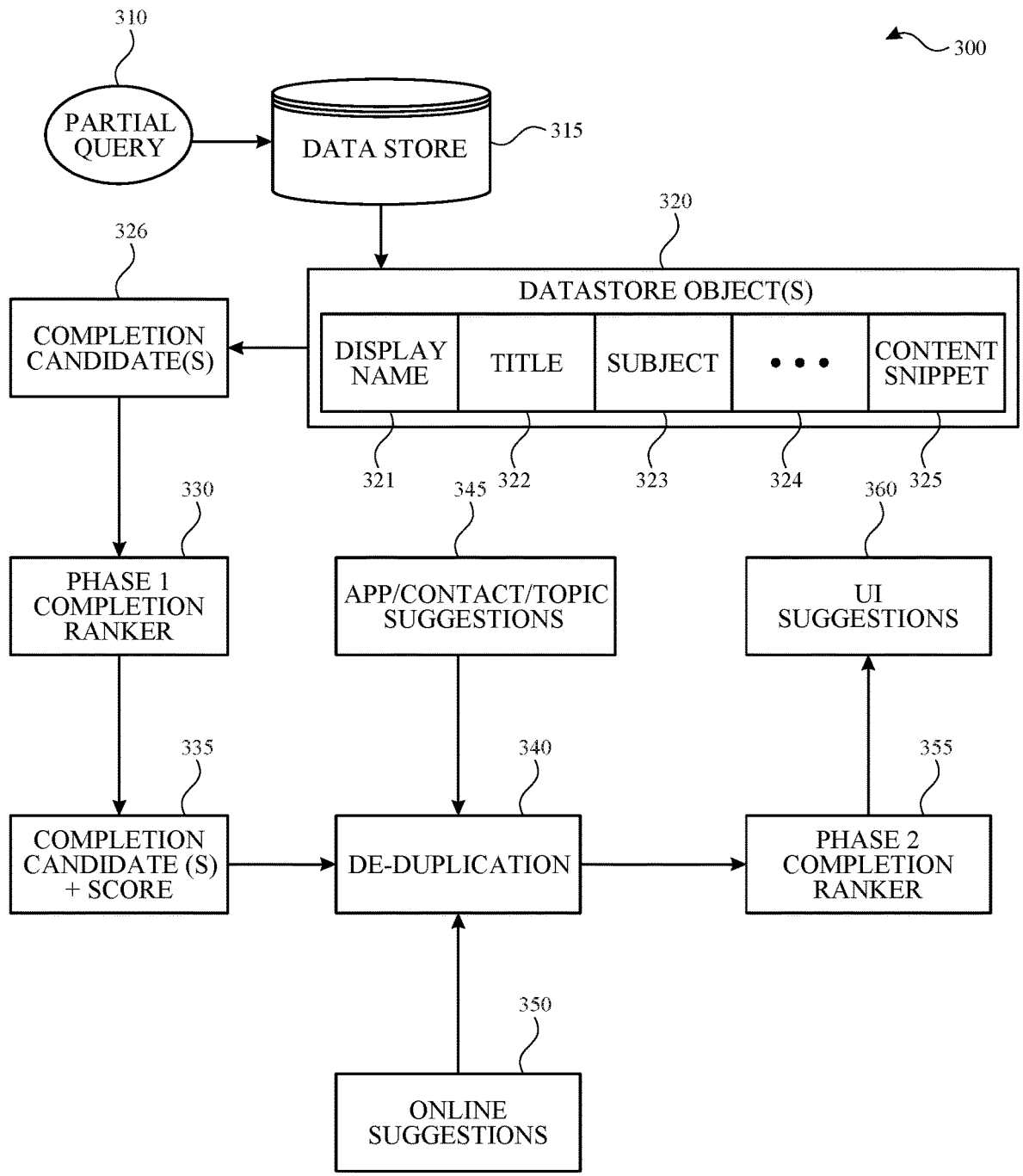
FIG. 3 illustrates an example data flow of a system for providing query completion suggestions in accordance with one or more implementations.

FIG. 3 illustrates an example data flow 300 of a system for providing query completion suggestions in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, all or part of the data flow 300 may be locally implemented by one or more of the electronic devices 102 or 104, such as via the host processor 202, to provide query completion suggestions, and/or all or part of the data flow 300 may be implemented by the server 108.

The data flow 300 includes a partial query 310, a datastore 315 a datastore object 320, one or more completion candidates 326, a phase 1 completion ranker module 330, one or more scored completion candidates 335, a de-duplication module 340, one or more application, contact, and/or topic suggestions 345, one or more online suggestions 350, a phase 2 completion ranker module 355, and one or more completion suggestions 360 to be provided to the user interface.

The datastore 315 may store one or more datastore objects 320 that correspond to local content, e.g. indexed content items. A datastore object 320 may include a display name field 321, a title field 322, a subject field 323, one or more other fields 324, and a content snippet field 325. One or more datastore objects 320 may be provided to the search module, for example, by applications installed on the electronic device 102. Thus, the one or more other fields 324 may be fields that are specific to, and/or configurable by, each individual application. In this manner, the applications installed on the electronic device 102 may provide the portions of content from which query completion suggestions will be generated.

In one or more implementations, local content may refer to content that is local to a system, such as a social networking system, rather than content that is local to a device. For example, the server 108 may provide a social networking system that may be accessed by a user of the electronic device 102, such as over the network 106. The user may have a user account with the social networking service, and the user account may be associated with various content, such as messages, photos, posts, and the like. Thus, in one or more implementations, the content associated with the user account may be considered local content with respect to the social networking system, and may be indexed and/or stored in the subject system as the datastore objects 320, such as at the server 108.

The fields 321-325 of the datastore objects 320 may have a configurable importance level that may be used to rank results that are found from a query or partial query matching one or more of the fields 321-325. For example, results generated from a match of the display name field 321 may be ranked higher than results generated from a match of the title field 322, and so on. The importance level of each of the fields 321-325 for a given datastore object 320 may be indicated by the application that provided the datastore object 320. Thus, each application may apply its own specific ranking to the fields 321-325 of the datastore objects 320. Alternatively, and/or in addition, the importance of the fields may be indicated/determined by the search module when the search is performed.

The fields 321-325 may include information that was provided in conjunction with the content snippet stored in the content snippet field 325. For example, each application that provides content to be indexed may provide the content with metadata that may be stored in one or more of the fields 321-325, such as a display name, a title, an author, a last accessed time, a creation time, etc. Whether a given application provides values for a particular field may be configurable by each application. The content snippet field 325 may include a snippet of the actual content that is being indexed, e.g., the portion of the content that is used for generating query suggestions.

When the partial query 310 is received, such as from a user inputting the partial query 310 to perform a search on the electronic device 102, the datastore 315 is searched for datastore objects 320 that match the partial query. In one or more implementations, the partial query 310 provided to the datastore 315 may also identify a subset of the fields 321-325 from which the completion suggestions should be generated from.

In one or more implementations, the partial query 310 is tokenized, and three search forms/patterns are used for identifying matching query completion suggestions: (a) as typed, prefix matching if appropriate (e.g., "John D" may be matched as "John D*", but "John Doe" may be matched as "John Doe"); (b) allowing for words separating the matches (e.g., "John D" may be matched as "John * D*"); and (c) ignoring the first N words, assuming they occur in different ones of the fields 321-325 (e.g., "John Doe completion patent" may be matched as one or more of: "Doe * completion * patent*", "completion * patent*", "patent*"). In one or more implementations, the three search forms/patterns may be ranked as (a)>(b)>(c); however, any ranking of the search forms/patterns may be used.

The partial query 310 is performed on the datastore 315, with a maximum result count, ranking queries to filter out low quality results, etc. As the query pulls results (e.g. as datastore objects 320) from the datastore 315, they are inspected, and the fields 321-325 of the datastore objects 320 are examined for matches. The fields 321-325 of the datastore objects 320 are compared the user's query string (using patterns (a), (b), and (c) above) and in case of match, the string will be tokenized starting at the match, and up to N tokens (or fragments) of the match will be added to a word tree as one of the completion candidates 326. In one or more implementations, the N tokens of a query completion suggestion may be referred to as an N-gram, where an N-gram is a contiguous sequence of n items from a given sequence of text or speech. The items may be, for example, phonemes, syllables, letters, words or base pairs. In one or more implementations, an N-gram may be a phrase. Accordingly, the electronic device 102 may use a phrase dictionary or other means to determine an appropriate stopping token for the N-gram, such as to avoid ending the N-gram with a stop word, punctuation, etc.

The word tree may be a recursive structure, such as, for example:
    word_trie_s* trie;
    uint64_t score;
    double age;
    int fieldIndex:5;
    int weight:24;
    int hasUsedDate:1;
    int is Shortcut:1;
    int isWhitespace:1;
    uint32_t threadId;
    si_completion_type_t completionType;
    uint8_t prefixLen;

Each entry in the word tree may have a "score", which is the maximum relevance score of the datastore object(s) 320 that contained the N-gram, an "age", which is the age in seconds of the newest datastore object 320 that contained the N-gram, a "fieldIndex", which corresponds to the lowest index of one of the fields 321-325 of the datastore object(s) 320 that produced the N-gram, a "weight", which is the number of times the N-gram has occurred (a parent node has always occurred at least as often as its children), a "hasUsed-Date", which indicates whether any of the datastore object(s) 320 result generating the N-gram has a last accessed date (otherwise age is based on creation), an "isShortcut", which indicates if the N-gram matches a previously used query (and/or whether the N-gram corresponds to a shortcut), an "isWhitespace", which indicates whether the N-gram is entirely whitespace or punctuation, a "threadId", which may be an identifier of a mail (or messages, etc.) thread/conversation the N-gram came from, and a "completionType", which may indicate a type of the N-gram (single phrase, non-adjacent words, cross-field). In one or more implementations, the "score" value may be based on what the relevance score of the result would be if a search was performed using the N-gram as the query.

Thus, in one or more implementations, each of the completion candidates 326 may be annotated to include information such as, what type of datastore object 320 the completion candidate 326 was generated from, which field(s) 321-325 the completion candidate 326 matched, what the last accessed date was for the datastore object 320 that the completion candidate 326 was generated from, an age associated with the datastore object 320, and the like.

When the query has generated all results, the word tree is iterated, and the N-grams it contains are ranked, such as by the phase 1 completion ranker module 330, and the K strongest candidates are returned as scored completion candidates 335. For example, the phase 1 completion ranker module 330 may use the set of N-gram features and weights that are discussed further below with respect to FIG. 8, as well as the scoring equation that is discussed further below with respect to FIG. 9, to score the N-grams.

One or more application, contact, and/or topic suggestions 345 may be returned if there is a strong (e.g., exact) match for the partial query 310. In one or more implementations, a contact name suggestion may be provided as one of the completion suggestions 360 displayed on the user interface irrespective of whether the corresponding contact is listed as a top hit (e.g., as is discussed further below with respect to FIG. 7). In one or more implementations, the partial query 310 may be searched against the contact's metadata (email address, contact identifier, etc.), e.g., rather than, or in addition to, a textual match on the name. In one or more implementations, a textual matching on a contact name could be performed and ranked lower than matching the metadata. In one or more implementations, a topic suggestion may be a suggestion of a particular topic that is determined to be of interest to the user, such as based on prior user activity.

With respect to application name suggestions, an application name suggestion may be provided if the application name is not being shown as a top hit, for example, if the partial query 310 is "ma," "Mail" may be displayed as a top hit and "Maps" may be provided as a query completion suggestion and/or as an application name suggestion. In another example, if the query string were the letter "M", "Mail" may be provided as a suggestion, ranked above other suggestions, e.g., application names may be ranked by a normal results ranker and the suggestions for applications may be ranked accordingly. Similarly, if the query string is "Joh", a match may be found for "John Doe," which may become a person or contact suggestion.

The scored completion candidates 335 may be aggregated by the de-duplication module 340 with any application, contact, and/or topic suggestions 345, and any online suggestions 350, e.g. from the server 108. For example, the partial query 310 may be provided to the server 108, and the server 108 may return one or more completion suggestions that may be referred to as online suggestions 350. The de-duplication module 340 may remove any duplicate completion suggestions, while also boosting the rank and/or score of any duplicate completion suggestions, such as to boost completion suggestions that were both received from the server 108 and were generated from a datastore object 320.

In one or more implementations, in order to preserve the privacy of the user, the electronic device 102 may provide the partial query 310 to the server 108 without providing any information from which the user of the electronic device 102 can be identified. For example, the electronic device 102 may provide the partial query 310 to the server 108 with broad topics of interest corresponding to the user of the electronic device 102. The topics of interest may provide the server 108 with some context in generating the online suggestions 350; however, the topics of interest may be so broad that the user is not identifiable. However, in instances where user privacy is not a concern, the electronic device 102 may provide information identifying the user, and/or may provide all or part of the datastore 315, to the server 108.

The de-duplicated suggestions are then provided to the phase 2 completion ranker module 355. The phase 2 completion ranker module 355 ranks all of the completion suggestions obtained from the various sources. In one or more implementations, the phase 2 completion ranker module 355 may generate a score for each of the completion suggestions to be compared against each other. In one or more implementations, the phase 2 completion ranker module 355 may individually rank the completion suggestions from the different sources and then may provide the top N results from each source, and/or the sources can be ranked relative to each other. The resulting one or more completion suggestions 360 are provided as output for display. An example user interface for displaying the one or more suggestions is discussed further below with respect to FIG. 6.

In one or more implementations, the phase 1 completion ranker module 330, the phase 2 completion ranker module 355, and/or the de-duplication module 340 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
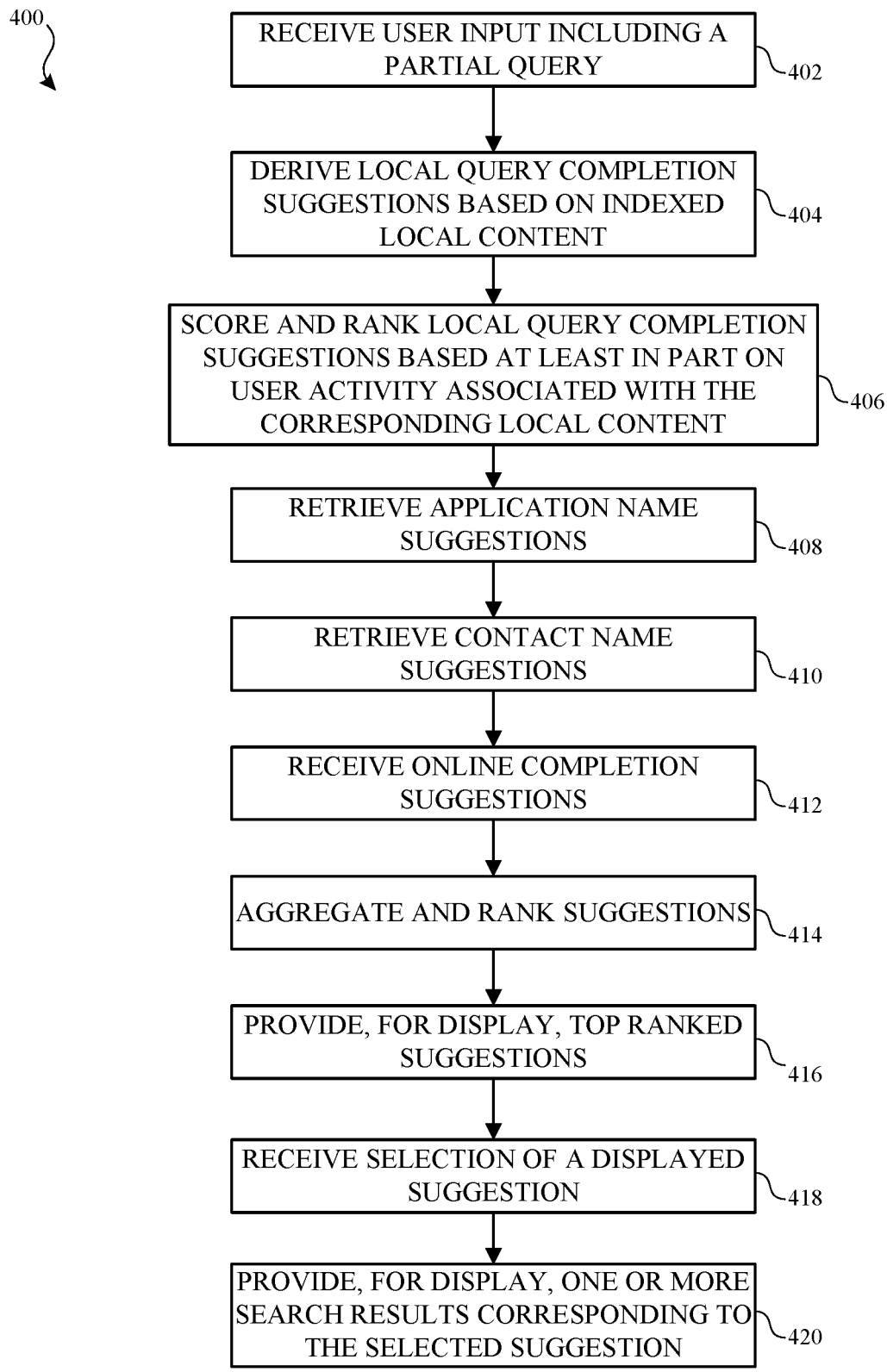
FIG. 4 illustrates a flow diagram of an example process for providing query completion suggestions in accordance with one or more implementations.

FIG. 4 illustrates a flow diagram of an example process 400 for providing query completion suggestions in accordance with one or more implementations. For explanatory purposes, the process 400 is primarily described herein with reference to the electronic device 102 of FIG. 1. However, the process 400 is not limited to the electronic device 102 of FIG. 1, and one or more blocks (or operations) of the process 400 may be performed by one or more other components of the electronic device 102 and/or by other suitable devices (e.g., the server 108 and/or the electronic device 104). Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The electronic device 102 may receive user input that includes at least a partial query or search term (402). For example, a user may input a partial query or search term to perform a search on the electronic device 102, such as an operating system-wide search and/or a device-wide search. The partial query or search term may include a first alphanumeric character of a query or search term, one or more characters of a query or search term, a complete query or search term, one or more complete search terms and one or more alphanumeric characters of a subsequent search term, and the like. In one or more implementations, the partial query may include zero characters, may be all or part of an image, and/or all or part of a multimedia file, such as an audio file and/or a video file.

The electronic device 102 may derive local query completion suggestions based on locally stored content that has been indexed and stored in the datastore 315 and that matches the partial query (404). For example, the electronic device 102 may tokenize the partial query and may search the datastore 315 for matching datastore objects 320, e.g. using the search patterns described above with respect to FIG. 3. The electronic device 102 may then extract the query completion suggestions from the matching datastore objects 320.

In one or more implementations, a query completion suggestion may be extracted from continuous characters of one or more of the fields 321-325 of a datastore object 320 and/or a query completion suggestion may extracted from discontinuous characters and/or phrases of a datastore object 320, such as characters and/or phrases from multiple different fields 321-325. In one or more implementations where the partial query includes zero characters, the electronic device 102 may determine that all of the datastore objects 320 match the partial query. For example, when a user first accesses a user interface with a search field, the subject system may automatically submit a partial query having zero characters in order to provide completions suggestions relevant to prior activity of the user before the user begins inputting a partial query.

The electronic device 102 may score and rank the local query completion suggestions based at least in part on user activity associated with the corresponding content items from which the query completion suggestions were generated from (406), such as using the phase 1 completion ranker module 330. For example, the phase 1 completion ranker module 330 may rank the completion suggestions based at least in part on the time that the corresponding content was last accessed or engaged with (e.g., through the selection of a search result), and/or the time that the corresponding content was created. In one or more implementations, the phase 1 completion ranker module 330 may use the set of features and weights that are discussed further below with respect to FIG. 8, and/or the scoring equation that is discussed further below with respect to FIG. 9, to score and rank the local query completion suggestions (406).

The electronic device 102 retrieves any application name suggestions that generate a match for the partial query (408), as well as any contact name suggestions that generate a match for the partial query (410). The electronic device 102 receives any online suggestions, such as from the server 108 (412). For example, the electronic device 102 may transmit the partial query to the server 108 and the server 108 may provide query completion suggestions generated from a broad base of users.

In one or more implementations, the server 108 may only provide the online suggestions when the online suggestions satisfy a minimum uniqueness score threshold, such as based on a number of prior occurrences and/or selections of a particular query completion suggestion relative to an average number of occurrences and/or selections across the entire database of suggestions at the server 108. The uniqueness score threshold may be set such that the server 108 does not provide overly generic or common completion suggestions to the electronic device 102. In one or more implementations, the online suggestions may also include suggestions generated from the user and/or other users interacting with different devices and/or with different modes of providing input, such as a user interacting with an intelligent personal assistant device or application, e.g. a voice interactive personal assistant.

The electronic device 102 aggregates and ranks all of the obtained suggestions, such as using the phase 2 completion ranker module 355 (414). The electronic device 102 then provides, for display, the top ranked suggestions (416). For example, the electronic device 102 may display the top N ranked locally generated suggestions, as well as the top M ranked online suggestions. In one or more implementations, an online suggestion may be boosted, e.g. may be given a higher ranking, if the online suggestion was previously engaged by the user. For example, in addition to providing the partial query to the server 108, the electronic device 102 may provide an indication of one or more past engaged suggestions for the partial query to the server 108, and/or the electronic device 102 may locally boost an online suggestion upon determining that it had been previously engaged. In one or more implementations, the electronic device 102 may display one or more contact name suggestions and/or one or more application name suggestions as part or all of the top N ranked locally generated suggestions when the contact name suggestions and/or application name suggestions are available. An example user interface for displaying suggestions is discussed further below with respect to FIG. 6.

After providing the top ranked suggestions for display (416), the electronic device 102 may receive a selection of one of the provided suggestions, such as by the user (418). In response to receiving the selection (418), the electronic device provides, for display, one or more search results corresponding to the selected suggestion (420). When the selected completion suggestion was generated locally at the electronic device 102, the one or more search results may include the content corresponding to the datastore object 320 from which the selected completion suggestion was generated. If the selected suggestion corresponds to an application name suggestion, the application may be launched, e.g., in addition to or in lieu of providing search results. Similarly, if the selected suggestion corresponds to a contact name suggestion, information regarding the contact may be provided, e.g. in addition to or in lieu of providing search results.

Figure 5:
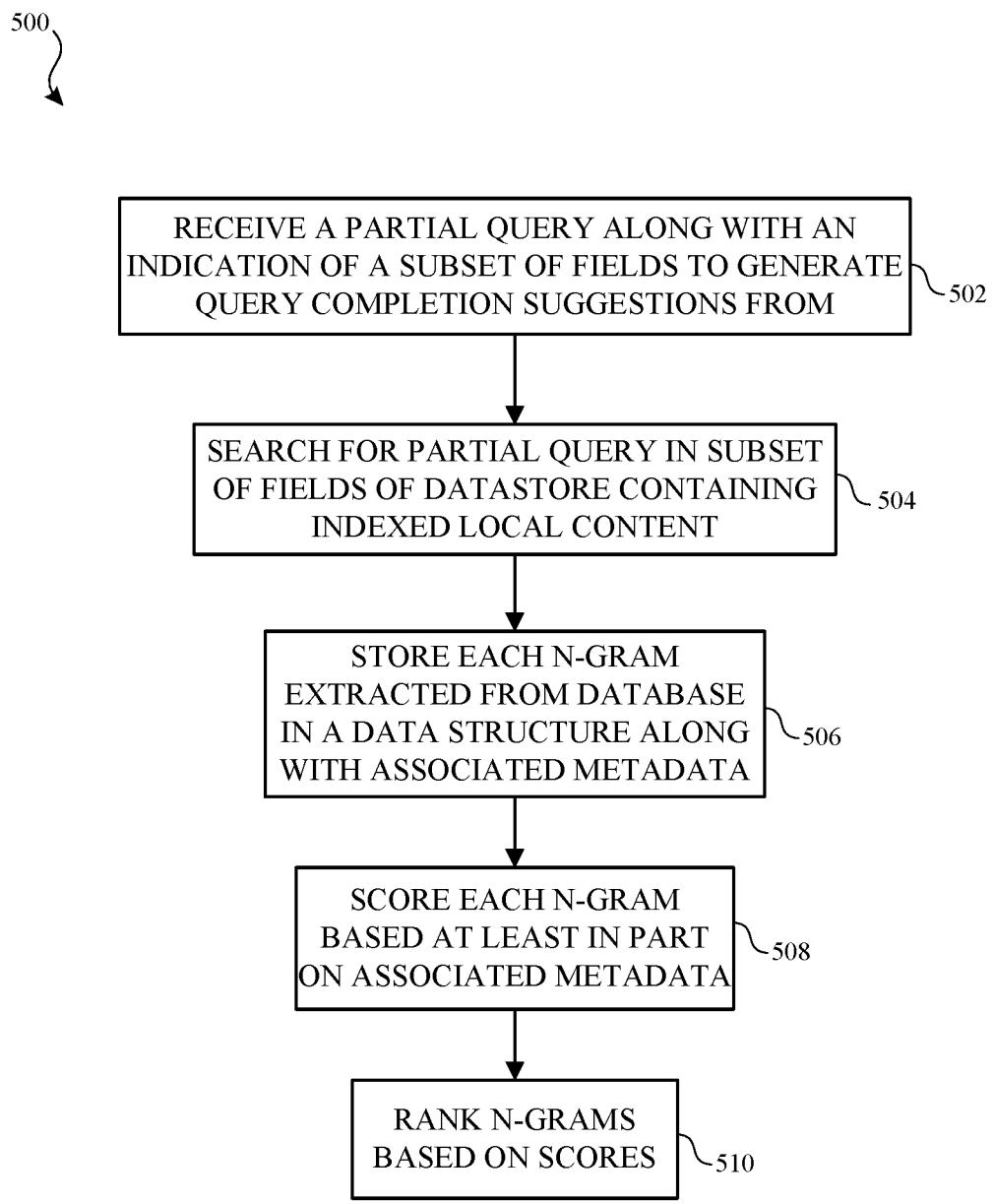
FIG. 5 illustrates a flow diagram of an example process for generating and ranking query completion suggestions from local content that matches a partial query in accordance with one or more implementations.

FIG. 5 illustrates a flow diagram of an example process 500 for generating and ranking query completion suggestions from local content items that match a partial query in accordance with one or more implementations. For explanatory purposes, the process 500 is primarily described herein with reference to the electronic device 102 of FIG. 1. However, the process 500 is not limited to the electronic device 102 of FIG. 1, and one or more blocks (or operations) of the process 500 may be performed by one or more other components of the electronic device 102 and/or by other suitable devices (e.g., the server 108 and/or the electronic device 104). Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The electronic device 102 receives a partial query along with an indication of a subset of the fields 321-325 of the datastore objects 320 from which to generate query completion suggestions from (502). For example, a user may input the partial search query in a system-wide search field, and an operating system process executing on the electronic device 102, such as a search module, may receive the partial query and may provide the partial query along with the indication of the subset of fields 321-325 of the datastore objects 320 from which to generate query completion suggestions from.

The electronic device 102 may search for the partial query in the indicated subset of the fields 321-325 of the datastore objects 320 of the datastore 315 containing the indexed local content (504), such as using the search forms/patterns discussed above. Upon identifying a match in one or more of the subset of the fields 321-325 of a datastore object 320, the electronic device 102 may extract the first N terms or tokens from the subset of the fields 321-325 (starting at the first matching term) as an N-gram, and may store the N-gram in a data structure, such as the word tree described above, along with metadata associated with the content corresponding to the datastore object 320 (506). Each N-gram may be considered a candidate query completion suggestion. The metadata may include information such as, a last accessed/engaged date of the content, a creation date of the content, and the like.

The electronic device 102 may score each of the N-grams based at least in part on the metadata associated with the content from which the N-grams were generated (508). For example, the electronic device 102 may score the N-grams based at least on the time that the corresponding content was last accessed/engaged with and/or created. An example set of features and corresponding weights are discussed further below with respect to FIG. 8, and an example scoring calculation utilizing the set of features and corresponding weights are discussed further below with respect to FIG. 9. The electronic device 102 may then rank the N-grams based on the determined scores (510).

Figure 6:
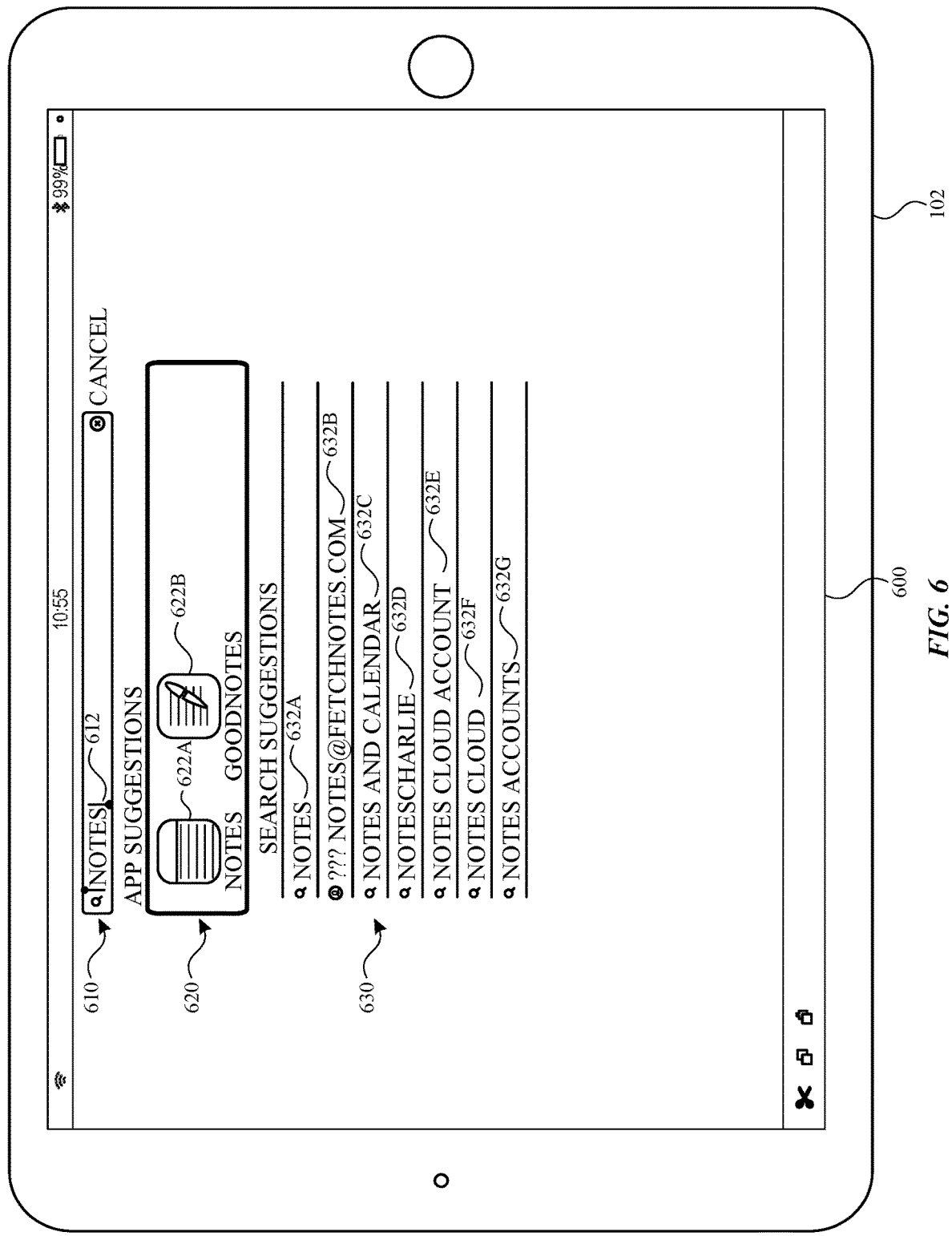
FIG. 6 illustrates an example electronic device displaying an example user interface for providing query completion suggestions in accordance with one or more implementations.

FIG. 6 illustrates an example electronic device 102 displaying an example user interface 600 for providing query completion suggestions in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The electronic device 102 includes a display screen that displays the user interface 600. The user interface 600 includes a search field 610, an app suggestions area 620 and a query completion suggestions area 630. The search field 610 may allow a user to input a partial query 612 (or complete query), such as to search content stored on the electronic device 102. The app suggestions area 620 may include one or more suggested apps 622A-B that were determined for the partial query 612 input in the search field 610. The query completion suggestions area 630 may include one or more query completion suggestions 632A-G that were determined for the partial query 612 input in the search field 610. The user interface 600 may also include a contacts suggestion area (not shown).

In one or more implementations, a query completion suggestion may refer to a query suggestion that contains all or part of the partial query 612. The query completion suggestion may contain all or part of the partial query 612 as a prefix, as a suffix, or anywhere in the middle of the query completion suggestion. For example, the query completion suggestion 632B of FIG. 6 includes the partial query 612 "notes" in the middle of the query completion suggestion 632B, e.g., "??? Notes@fetchnotes.com." Furthermore, a query completion suggestion may only include the partial query 612 that was input by the user. For example, the query completion suggestion 632A of FIG. 6 only includes the partial query 612, e.g. "notes."

The user may select one of the query completion suggestions 632A-G, such as by clicking or touching one of the query completion suggestions 632A-G, to perform a search with the selected query completion suggestion. After the search is performed, the search results may be presented to the user, such as using the user interface that is discussed further below with respect to FIG. 7.

In one or more implementations, the apps suggestion area 620 and the query completion suggestions area 630 may be updated in real-time as the user types additional characters into the search field 610. For example, each time a subsequent character, or a number of subsequent characters, are entered by the user, the apps suggestion area 620 and the query completion suggestions area 630 may be updated to reflect the additional characters entered into the search field 610.

Figure 7:
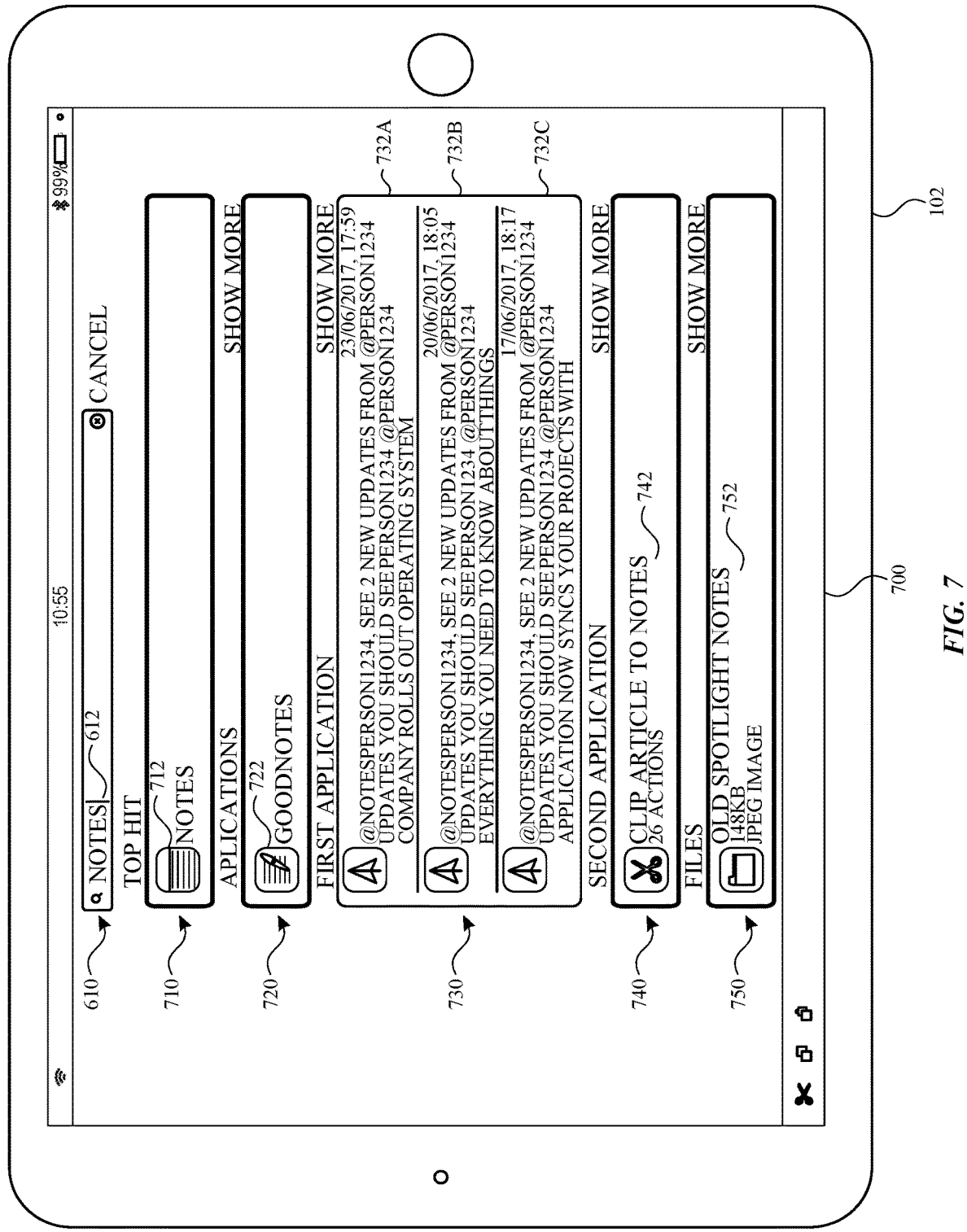
FIG. 7 illustrates an example electronic device displaying an example user interface for providing search results after a user selection of a query completion suggestion in accordance with one or more implementations.

FIG. 7 illustrates an example electronic device displaying an example user interface 700 for providing search results after a user selection of a query completion suggestion in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The electronic device 102 includes a display screen that displays the user interface 700. In one or more implementations, the user interface 700 may be displayed when the user selects the query completion suggestion 632A ("notes") from FIG. 6. The user interface 700 includes the search field 610, a top hits area 710 that displays one or more top hits 712, an applications area 720 that displays one or more matching applications 722, a first application specific area 730 that displays first application specific results 732A-C, a second application specific area 740 that displays one or more second application specific results 742, and a files area 750 that displays one or more matching files 752. In one or more implementations, the top hits 712 displayed in the top hits area 710 may be applications, contacts, etc. that generate strong matches for the partial query.

FIG. 8 illustrates example N-gram features and weights or parameters (e.g., COMPLETION_K1 through COMPLETION_K16) in accordance with one or more implementations. The weights may be used in the example scoring equation discussed further below with respect to FIG. 9, e.g., to determine a relevance score for one or more of the query completion suggestions.

In one or more implementations, the weights and/or features may be pre-determined by the server 108, such as by using one or more machine learning models. For example, the server 108 may utilize one or more machine learning models to determine the features and weights that result in the query completion suggestions being ranked with the most relevant query completion suggestions ranked highest, such as by processing a large dataset of training data corresponding to prior user queries and selections. The server 108 may then transmit the weights and/or features to the electronic device 102 (and other electronic devices, e.g. the electronic device 104), and the electronic device 102 may use the weights when determining scores for the locally generated query completion suggestions.

In one or more implementations, the electronic device 102 may collect feedback associated with the weights, e.g., user behavior (engagements, etc.), and the electronic device 102 may provide the feedback to the server 108. For example, the electronic device 102 may store an indication of which completion suggestion was engaged by the user after inputting a particular partial query, and the electronic device 102 may provide the stored indications to the server 108 as feedback. The server 108 may retrain the one or more machine learning models to optimize user engagement based on the received feedback. The retrained machine learning models may be used to update and/or tune the weights and the updated weights may be transmitted to the electronic device 102. In one or more implementations, the electronic device 102 may locally maintain and/or retrain the machine learning models, and may locally generate/update the weights.

In one or more implementations, after a user is presented with a set of query completion suggestions via the subject system, the server 108 may receive information regarding the query completion suggestion that was selected by the user, such as when the user opts in to providing diagnostic information to the server 108. The server 108 may use user selections in aggregate to retrain/modify the models over time, and adjust the features and/or weights as indicated by the models. When the features and/or weights are updated, the server 108 may transmit the updated features and/or weights to the electronic device 102 and the electronic device 102 may implement the updated features and/or weights in the scoring calculation. In one or more implementations, a higher score may be given for exact matches, e.g., as opposed to fuzzy matches.

In FIG. 8, the value of COMPLETION_K1 may be, for example, in the range of 1.0-4.0, such as in order to provide a boost for more frequently occurring N-grams. For example, COMPLETION_K1 may be used to increase the score for an N-gram when the N-gram matches multiple different datastore objects 320 and/or multiple different fields 321-325.

The value of COMPLETION_K2 may be, for example, in the range of 0.05-0.15, such as in order to provide a weight for the datastore object 320 from which the N-gram was generated. For example, the datastore objects 320 may be stored in the datastore 315 with relevance/popularity scores, and/or an expected relevance score for a datastore object 320 may be generated based on an expected relevance of the datastore object 320 to a query performed using the N-gram.

The value of COMPLETION_K3 may be, for example, in the range of 0.1-0.5, such as in order to boost longer query completion suggestions, e.g., as opposed to shorter query completion suggestions. The value of COMPLETION_K4 may be, for example, in the range of 0.1-0.5, such as in order to boost for query completion suggestions that include more tokens or fragments.

The value of COMPLETION_K5 may be, for example, in the range of 0.3-0.7, such as to boost for N-grams that have more than a percentage, C, of all occurrences of the parent N-grams. The percentage C may be, for example, in the range of 15%-40%. The value of COMPLETION_K6 may be, for example, in the range of 0.1-0.4, such as to boost for N-grams that have more than a percentage, D, of all occurrences of the root N-gram. The percentage D may be, for example, in the range of 15%-40%.

The value of COMPLETION_K7 may be, for example, in the range of 0.1-0.4, such as to boost for N-grams that have more than a percentage, D, of all the occurrences observed. The percentage D may be, for example, in the range of 5%-20%. The value of COMPLETION_K8 may be, for example, in the range of 0.1-0.4, such as to weight for a linguistically interesting (or distinct) N-gram.

In one or more implementations, a linguistically interesting (or distinct) N-gram may be determined using a phrase dictionary that is locally stored on the electronic device 102. For example, the server 108 may transmit the phrase dictionary to the electronic device 102, and may subsequently transmit updates to the phrase dictionary to the electronic device 102. The phrase dictionary may include different phrases as well as a score or value that is indicative of the popularity of the phrase amongst multiple different users, such as all users. For example, the server 108 may obtain a dataset corresponding to phrases used (e.g., searched for) by multiple different users, and the server 108 may score the phrases by the number of times they were used by the multiple different users, e.g. relative to all of the phrases used.

In one or more implementations, the COMPLETION_K8 may also incorporate a determination of whether the N-gram is just a stopword or ends in a stopword. The stopwords themselves may also be identified from a database or dictionary that is provided to the electronic device 102 by the server 108, and may be subsequently updated by the server 108. Thus, the score for an N-gram that is linguistically interesting but contains only a stopword, or ends in a stopword, may not be boosted as much as the score for an N-gram that is linguistically interesting and does not only contain, or end in, a stopword.

The value of COMPLETION_K9 may be, for example, in the range of 0.7-1.3, such as to boost for more interesting fields 321-325. For example, the fields 321-325 may have a configurable importance or interest level that may be set by, e.g., the process performing the search and/or the applications that provided the data stored in the fields 321-325.

The value of COMPLETION_K10 may be, for example, in the range of −0.7 through −1.3, such as to penalize for N-grams that only occur in a single conversation, such as a single email conversation, a single messaging conversation, and the like. The value of the constant A in COMPLETION_K11 may be, for example, in the range of 3-7, with the value of COMPLETION_K11 being dependent on the value of COMPLETION_K3, such as to penalize for very long suggestions (e.g., N-grams) irrespective of the number of fragments or tokens in the N-grams.

The value of COMPLETION_K12 may be, for example, in the range of 0.3-0.7, such as in order to boost for an N-gram that matched a previously engaged (e.g., selected) search result for the same partial query for which the query completion suggestion is being generated. The value of COMPLETION_K13 may be, for example, in the range of 1.7-2.3, such as to boost for an N-gram that matched a previously engaged search result irrespective of the query that caused the engaged result to be displayed. The value of the constant B in COMPLETION_K14 may be, for example, in the range of 0.8-1.4, with the value of COMPLETION_K14 being dependent on COMPLETION_K4, such as to penalize for longer N-grams in terms of the number of tokens in the N-grams. The value of COMPLETION_K15 may be, for example, in the range of 0.7-1.3, such as to punish for N-grams that correspond to older datastore objects 320 (e.g., older content, or content that was accessed less recently). The value of COMPLETION_K16 may be, for example, in the range of −0.7 through −1.3, such as to penalize for N-grams that contain a misspelling.

FIG. 9 illustrates an example scoring equation for scoring query completion suggestions in accordance with one or more implementations. The scoring equation in FIG. 9 utilizes the values described above with respect to FIG. 8, and may be used to score N-grams (e.g., candidate query completion suggestions) obtained from the datastore objects 320 (e.g., indexed content items). In the scoring equation in FIG. 9, the constants X and Y may have values in the range of, for example, 1-4. The values of the WEIGHT1_THRESHOLD, WEIGHT2_THRESHOLD, and WEIGHT3_THRESHOLD, may be, for example, in the range of 0.05-0.45. The value of the AGE_THRESHOLD may be, for example, in the range of 0-5. The value of SECONDS may be, for example, in the range of 2400-4800. The value of HOURS may be, for example, in the range of 12-36. The value of DAYS may be, for example, in the range of 180-540. The value of CONSTANT may be, for example, in the range of 3.0-7.0.

In FIG. 9, completionCount value may indicate the number of times that the N-gram being scored matched the fields 321-325 of the datastore objects 320. The score value may be the highest relevance score of the datastore objects 320 that matched the N-gram. The len value may be the total length of the N-gram, e.g. in alphanumeric characters. The COMPLETION_LEN_THRESHOLD value may indicate the maximum length of an N-gram before the score of the N-gram is reduced for the N-gram being too long. The scoringFragmentCount value may indicate the number of tokens, or fragments, in the N-gram, and the COMPLETION_FRAGMENT_THRESHOLD may indicate the maximum number of fragments in an N-gram before the score of the N-gram is reduced for the N-gram having too many fragments.

The weightF1 value corresponds to a percentage of the occurrences of the parent N-gram that correspond to the N-gram, the weightF2 value corresponds to a percentage of the occurrences of the root N-gram that correspond to the N-gram, the weightF3 value corresponds to a percentage of all occurrences observed that correspond to the N-gram. The phraseScore value may correspond to the value of the N-gram, e.g. as indicated by the phrase dictionary that reflects the popularity (or uniqueness) of the N-gram with respect to all users.

The fieldWeight value corresponds to the highest weight for the one of the fields 321-325 from which the N-gram was generated. The threadWeight value indicates a weight for the number of threads in which the N-gram occurred. The isShortcut value indicates whether the N-gram matches a previously engaged search result for the same partial query. The hasUsedDate value indicates whether the N-gram matches a previously engaged search result irrespective of the query. The age value indicates the age of the datastore object 320 (e.g., content item) from which the N-gram was generated.

Figure 10:
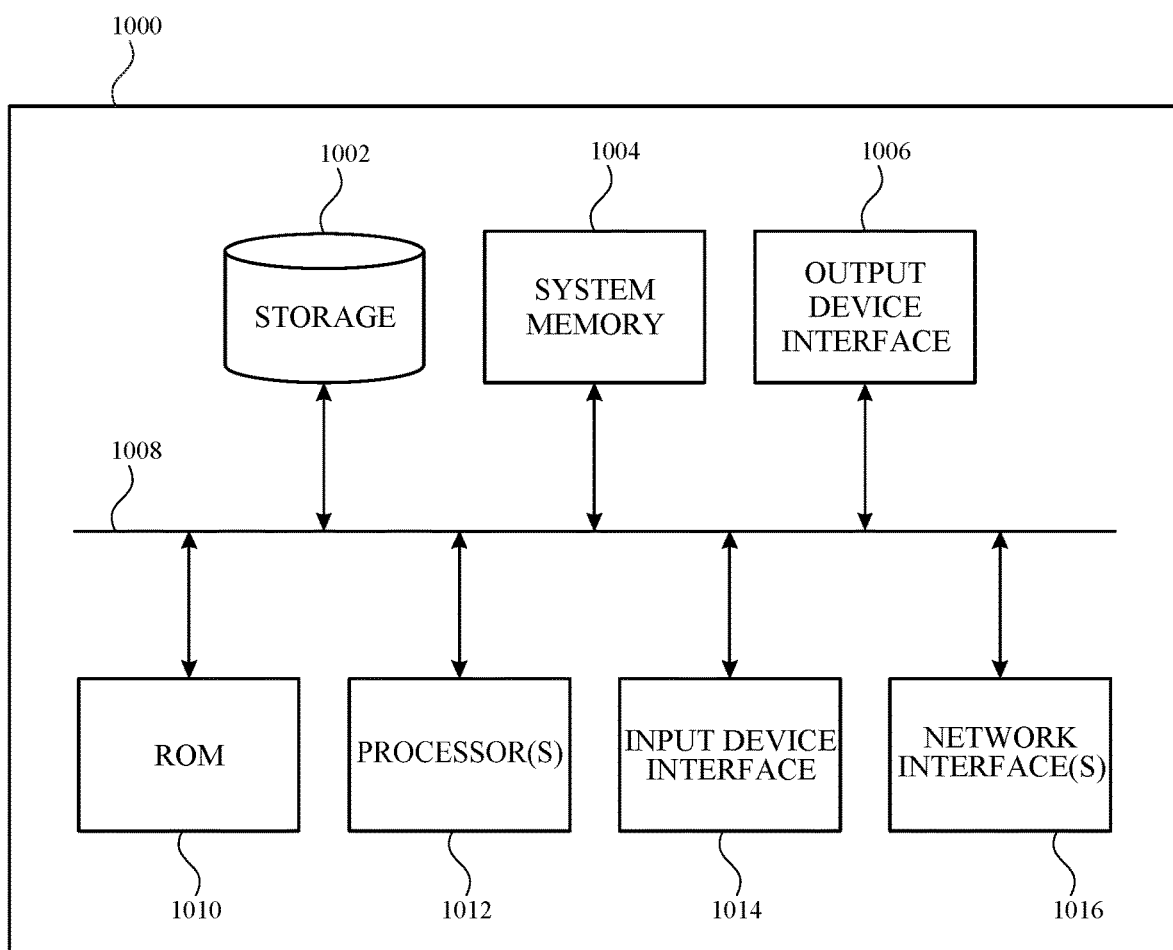
FIG. 10 illustrates an example electronic system with which aspects of the subject technology may be implemented in accordance with one or more implementations.

FIG. 10 illustrates an electronic system 1000 with which one or more implementations of the subject technology may be implemented. The electronic system 1000 can be, and/or can be a part of, one or more of the electronic devices 102 or 104, and/or one or the server 108 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the electronic device 102 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation.

Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
receiving, by an electronic device, a partial query;
deriving one or more query completion suggestions for the partial query from content items that are locally stored on the electronic device, each respective query completion suggestion being associated with metadata extracted from one of the content items from which the respective query completion suggestion was derived;
ranking the one or more query completion suggestions based at least in part on the metadata associated with each of the one or more query completion suggestions;
transmitting, to a server, the partial query;
receiving, from the server, one or more additional ranked query completion suggestions;
aggregating the one or more additional ranked query completion suggestions with the one or more ranked query completion suggestions, wherein the aggregating comprises increasing a ranking of at least one of the one or more ranked query completion suggestions when the one or more additional ranked query completion suggestions comprises the at least one of the one or more ranked query completion suggestions; and
providing, for display, a number of highest ranked query completion suggestions of the aggregated one or more additional ranked query completion suggestions and the one or more ranked query completion suggestions.

2. The method of claim 1, further comprising:
receiving, from one or more applications installed on the electronic device, at least some of the content items from which the one or more query completion suggestions are derived.

3. The method of claim 1, further comprising:
generating a score for each of the one or more query completion suggestions based at least in part on the metadata associated with each of the one or more query completion suggestions, wherein ranking the one or more query completion suggestions is based at least in part on the score generated for each of the one or more query completion suggestions.

4. The method of claim 3, wherein the metadata associated with at least one of the one or more query completion suggestions comprises temporal information corresponding to user activity associated with one of the content items from which the at least one of the one or more query completion suggestions was derived.

5. The method of claim 4, wherein the score generated for the at least one of the one or more query completion suggestions is based at least in part on the temporal information corresponding to the user activity associated with the one of the content items from which the at least one of the one or more query completion suggestions was derived.

6. The method of claim 5, further comprising:
displaying the number of highest ranked completion suggestions of the aggregated one or more additional ranked query completion suggestions and the one or more ranked query completion suggestions;
receiving a selection of one of the displayed one or more ranked query completion suggestions; and
responsive to receiving the selection, displaying information corresponding to the one of the content items from which the at least one of the one or more ranked query completion suggestions was derived.

7. The method of claim 1, wherein at least one of the one or more ranked query completion suggestions comprises at least one of an application name or a contact name.

8. The method of claim 1, wherein the content items are user-generated content items that were generated on the electronic device.

9. The method of claim 1, wherein the partial query comprises zero or more characters.

10. A computer program product comprising code stored in a non-transitory computer-readable storage medium, the code, when executed by at least one processor, causes the at least one processor to:

receive a partial query;
derive query completion suggestions for the partial query from content items that are locally stored, each of the content items being associated with a last accessed time;
rank the query completion suggestions based at least in part on the last accessed times associated with the content items from which the query completion suggestions were derived;
transmit, to a server, the partial query;
receive, from the server, one or more additional ranked query completion suggestions;
aggregate the one or more additional ranked query completion suggestions with the ranked query completion suggestions, wherein the aggregating comprises increasing a ranking of at least one of the ranked query completion suggestions when the one or more additional ranked query completion suggestions comprises the at least one of the ranked query completion suggestions; and
provide, for display, a number of highest ranked query completion suggestions of the aggregated one or more additional ranked query completion suggestions and the ranked query completion suggestions.

11. The computer program product of claim 10, wherein the code, when executed by at least one processor, further causes the at least one processor to:
receive, prior to receipt of the partial query, the content items, each of the content items comprising fields.

12. The computer program product of claim 11, wherein the code, when executed by at least one processor, further causes the at least one processor to:
receive, in conjunction with the partial query, an indication of a subset of the fields of the content items from which to derive the query completion suggestions.

13. The computer program product of claim 12, wherein the code, when executed by at least one processor, further causes the at least one processor to:
search the subset of the fields of the content items for N-grams that include the partial query;
rank each of the N-grams based at least in part on the last accessed time associated with a respective one of the content items from that included each of the N-grams; and
provide, for display, at least a highest ranked one of the N-grams.

14. The computer program product of claim 10, wherein the content items are locally stored on an electronic device and the last accessed time of each of the content items corresponds to a time that each of the content items was last accessed via the electronic device.

15. The computer program product of claim 10, wherein the partial query comprises zero or more characters.

16. A device comprising:
at least one memory configured to store content items derived from user generated content, each of the content items being associated with metadata;
at least one processor configured to:
receive a partial query;
extract phrases from the content items that include the partial query;
rank the phrases based at least in part on the metadata associated with the content items from which the phrases were extracted;
derive ranked query completion suggestions for the partial query from the ranked phrases;
transmit, to a server, the partial query;
receive, from the server, one or more additional ranked query completion suggestions;
aggregate the one or more additional ranked query completion suggestions with the ranked query completion suggestions, wherein the aggregating comprises increasing a ranking of at least one of the ranked query completion suggestions when the one or more additional ranked query completion suggestions comprises the at least one of the ranked query completion suggestions; and
provide, for display, a number of highest ranked of the aggregated one or more additional ranked query completion suggestions and the ranked query completion suggestions.

17. The device of claim 16, wherein the user generated content was generated on the device.

18. The device of claim 16, wherein the at least one processor is further configured to locally extract at least one of the phrases without accessing the server.

19. The device of claim 16, wherein the at least one processor is configured to:
display the number of the highest ranked of the aggregated one or more additional ranked query completion suggestions and the ranked query completion suggestions;
receive a selection of one of the ranked query completion suggestions, the one of the ranked query completion suggestions having been extracted from one of the content items; and
provide, for display, the user generated content from which the one of the content items was derived.

20. The device of claim 16, wherein the partial query comprises zero or more characters.

21. The device of claim 20, the one or more processors are further configured to:
receive, prior to receipt of the partial query, the content items, each of the content items comprising fields corresponding to the metadata.

22. The device of claim 21, wherein the one or more processors are further configured to:
receive, in conjunction with the partial query, an indication of a subset of the fields of the content items from which to derive the ranked query completion suggestions.

23. The device of claim 22, wherein the one or more processors are configured to rank the phrases based at least in part on the metadata, at least in part, by:
searching the subset of the fields of the content items for N-grams that include the partial query; and
ranking each of the N-grams based at least in part on a last accessed time associated with a respective one of the content items that included each of the N-grams.

* * * * *